United States Patent
Wagner et al.

(10) Patent No.: US 6,603,136 B1
(45) Date of Patent: Aug. 5, 2003

(54) LASER MARKER FOCAL LENGTH SETTING DEVICE

(75) Inventors: Ronald William Wagner, Elgin, IL (US); Brett Torre Crawley, Hoffman Estates, IL (US)

(73) Assignee: Videojet Systems International, Wood Dale, IL (US)

( * ) Notice: Subject to any disclaimer, the term of this patent is extended or adjusted under 35 U.S.C. 154(b) by 0 days.

(21) Appl. No.: 09/419,460

(22) Filed: Oct. 15, 1999

(51) Int. Cl.[7] ................................................ B23K 26/02
(52) U.S. Cl. .............. 250/559.38; 250/221; 219/121.78
(58) Field of Search .................................. 250/216, 221, 250/222.1, 223 R, 224, 559.3, 559.38; 219/121.78, 121.81, 121.82, 121.83; 235/462.23, 462.24; 342/118, 123; 347/258

(56) References Cited

U.S. PATENT DOCUMENTS

| | | | |
|---|---|---|---|
| 4,536,639 A | * 8/1985 | Crahay | 219/121.78 |
| 4,730,190 A | * 3/1988 | Win et al. | 342/118 |
| 5,387,786 A | * 2/1995 | Peng | 235/462.24 |
| 5,486,677 A | * 1/1996 | Maischner et al. | 219/121.83 |
| 5,538,056 A | * 7/1996 | Thoma | 144/342 |
| 5,675,326 A | 10/1997 | Juds et al. | |
| 5,829,152 A | 11/1998 | Potter et al. | |
| 6,097,420 A | * 8/2000 | Baba et al. | 347/258 |

FOREIGN PATENT DOCUMENTS

| | | |
|---|---|---|
| GB | 2202647 A | 9/1988 |
| JP | 9132203 A | 5/1997 |
| WO | WO 96/14943 | 5/1996 |

* cited by examiner

*Primary Examiner*—Stephone Allen
(74) *Attorney, Agent, or Firm*—Leydig, Voit & Mayer, Ltd.

(57) ABSTRACT

An improved laser marking focal length setting device allows an operator of a laser marking apparatus to easily and properly set the distance between a movable laser source output and an item to be marked. The device includes a sensor which is mounted at the same distance from the item to be marked as the laser source output. The device further includes an array of light emitting diodes, each of which corresponds to a predetermined focal length. In operation, the laser source output and sensor are moved together along the axis of the laser beam. The sensor supplies a signal indicative of the distance between the sensor and item. Because the laser source output and sensor are located at the same distance from the item to be marked, this signal is also indicative of the distance from the laser source output to the item. When the distance sensed is a focal length corresponding to one of the LED's, that LED lights. When the lit LED corresponds to the focal length of the current output lens, the operator may fix the output in its current position. Alternatively, the output is drivably connected to a motor, which is responsive to the sensor to drive the output to one of a plurality of predetermined distances.

22 Claims, 4 Drawing Sheets

LASER MARKER FOCAL LENGTH SETTING DEVICE

TECHNICAL FIELD

This invention relates generally to laser marking of products and, more particularly, relates to detection and indication of the distance between a laser marking apparatus and a product to be marked.

BACKGROUND OF THE INVENTION

There exist many different ways to place printed matter on a product package, including ink printing on the product, laser marking on the product, and ink or laser preprinting of a label to be placed upon the product. Of these, laser marking the product is often the most desirable alternative because of its low cost and easy adaptation to different marking jobs. It is especially useful in putting final markings, such as expiration dates and the like, on completed products. The technique of laser marking entails directing a focussed beam of light generated by a laser at a product. The focussed laser light marks the surface by burning caused by absorption of the light and a transformation of that light, or photon, energy into heat energy. Alternatively, the photons of the focussed laser light may interact directly with the material of the target without an intermediate transformation into heat energy.

In either case, the degree of visual change in the target material will be a function to some extent of the energy density in the focussed laser light, which is partly a function of the beam focus. Additionally, the sharpness of the mark may also be affected by the degree of focus of the laser beam. Accordingly, it is important that the distance between the product to be marked and the laser light focussing lens closely match the focal length of the lens. Additionally, the laser light focussing lens is often changed in order to facilitate the making of different sized markings. It is desirable in such cases that an operator be able to easily and quickly adjust the distance between lens and product to match the desired distance.

Many lasers used for marking applications emit light that falls outside of the human visible spectrum, and thus visual optimization of the focus is impractical. Even where the laser light is visible, it is often difficult to visually optimize the focus. Accordingly, in the past, operators of industrial laser marking systems have manually measured the distance between the lens and product, using a ruler, and have adjusted the distance to match the known focal length of the lens. Alternatively, or in addition, the distance is sometimes varied as several trial pieces of product are marked, and the distance is fixed when the product appears to be properly marked. Neither of these methods is fast or easy, and the second method involves wasting the improperly marked trial pieces.

A method and apparatus are needed whereby a laser marking equipment operator may receive a human-perceivable indication of the distance from lens to product to be marked, so that such distance may be set equal to the focal length of the lens, or to another desired distance.

SUMMARY OF THE INVENTION

According to an embodiment of the present invention, a distance measuring sensor is mounted proximal to and at the same vertical height as a laser light focussing lens, in an industrial laser marking apparatus. Indicators actuated by the distance measuring sensor give a human-perceivable indication of the distance between the sensor and a target. Due to the proximal placement of the distance measuring sensor to the laser light focussing lens, the human-perceivable indication serves to indicate the distance between the laser light focussing lens and the target as well. The human-perceivable indication may be comprised of light emitting diodes (LED's) which are activated selectively to indicate the measured distance.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF PREFERRED EMBODIMENTS

Figure 1:
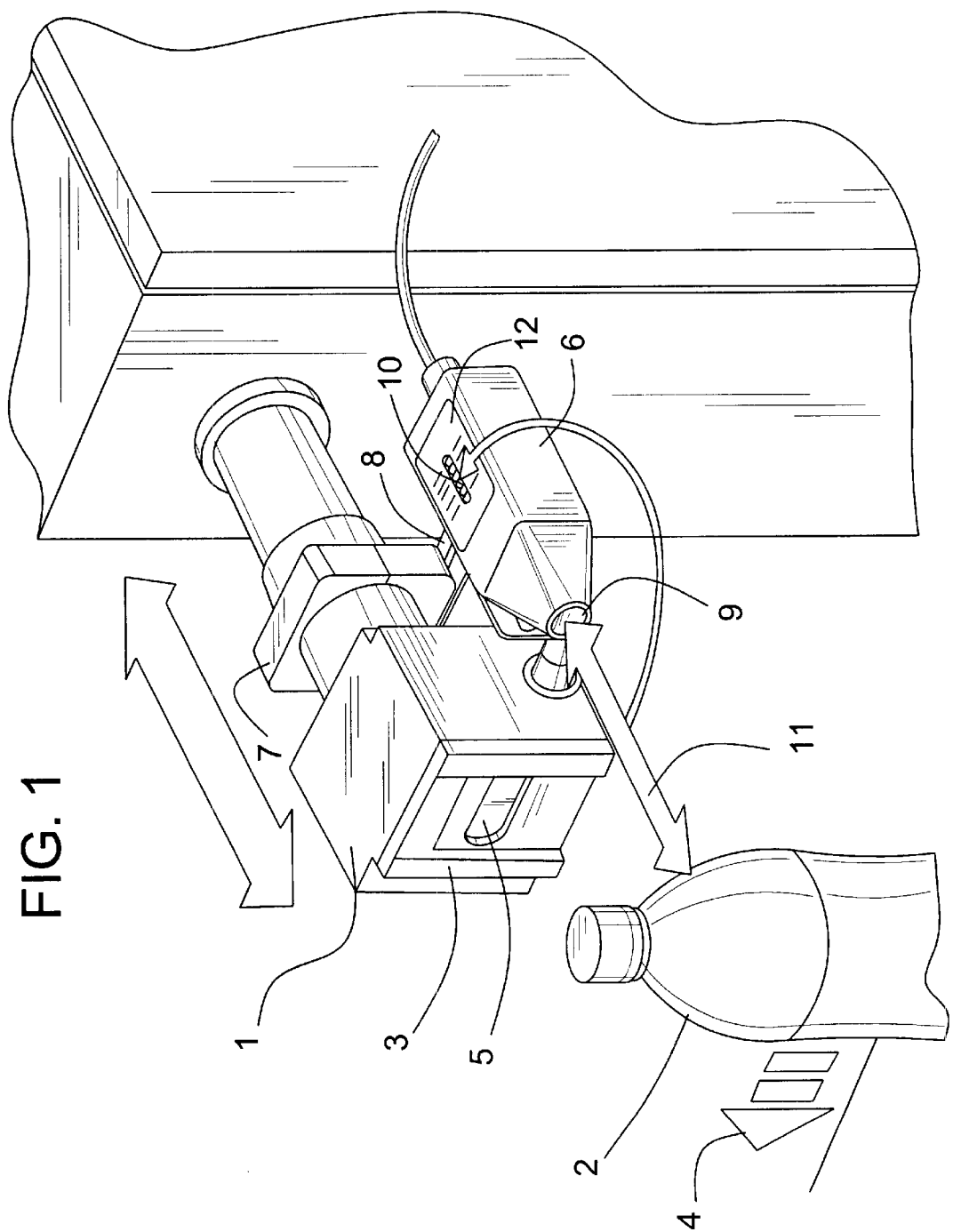
FIG. 1 is a schematic diagram generally illustrating an operating environment and mode of operation for a sensor system according to an embodiment of the invention.

Turning to the drawings, wherein like reference numerals refer to like elements, FIG. 1 illustrates a preferred operating environment and mode of operation for a sensor system embodying the invention. An industrial laser marking apparatus has a movable laser head 1 for directing the output of a laser to a product 2 to be marked. A lens mount 3 is disposed to alternately receive different output lenses having different focal lengths. Typically, the necessary output lens focal length is a function of the size of the features to be marked. Accordingly, if the size of the marked features is to be changed, for example from a smaller to a larger font size, then the output lens focal length is also changed.

Product 2 to be marked traverses a path 4 which typically intersects and is locally perpendicular to the axis of the output laser beam, at a product position in front of the beam output. The position of the laser head 1 is typically movable at least along the axis of the output laser beam, while the position of the path 4 of the product 2 is typically not changeable along this axis. The distance between the output lens 5 and the path 4 of the product 2 to be marked is temporarily fixed during marking in accordance with the focal length of the current output lens 5.

Preferably, a sensor unit 6 is fixedly mounted to a movable output of the laser apparatus via a clamp 7, and an extension arm 8. The sensor unit 6 is mounted such that a sensor element 9 is aligned with the laser output lens 5. In such an embodiment, the distance from the laser output lens 5 to the products on the path 4 will correspond to the distance from the sensor element 9 in the sensor unit 6 to the products on the path 4. Accordingly, any subsequent adjustment of the distance from the output lens 5 to the product path 4 will cause the distance from the sensor element 9 to the products on the path 4 to change by the same amount.

In a preferred embodiment, the sensor element 9 is an ultrasonic sensor such as the Hyde Park SM606A-BOB-00. This sensor comprises an ultrasonic transmitter and ultrasonic sensor. The sensor converts sensed distance into an analog output signal. Thus, as the product passes along the product path 4 in front of the sensor element 9, the ultrasonic sensor generates an analog signal indicative of the distance 11 from the laser output lens 5 and the sensor element 9 to the products on the path 4.

The sensor unit 6 has mounted thereon a human-perceivable indicator of the distance 11. In a preferred embodiment, the human-perceivable indicator is an array of five LED's 10 which are sequentially disposed to light according to the distance 11. Thus, in this embodiment, there exists in the array 10 an LED for each potential focal length. These focal lengths may be 2.5", 3.75", 5", 7.5", and 10". Alternatively, there may be more or different desired focal lengths, each of which would preferably have a corresponding LED in the array 10. The LED's may be of the same or different color, and are preferably disposed adjacent to a key 12 which explains the meaning of each. For example, the distance to which a given LED corresponds may be written on the key next to the appropriate LED.

Figure 2:
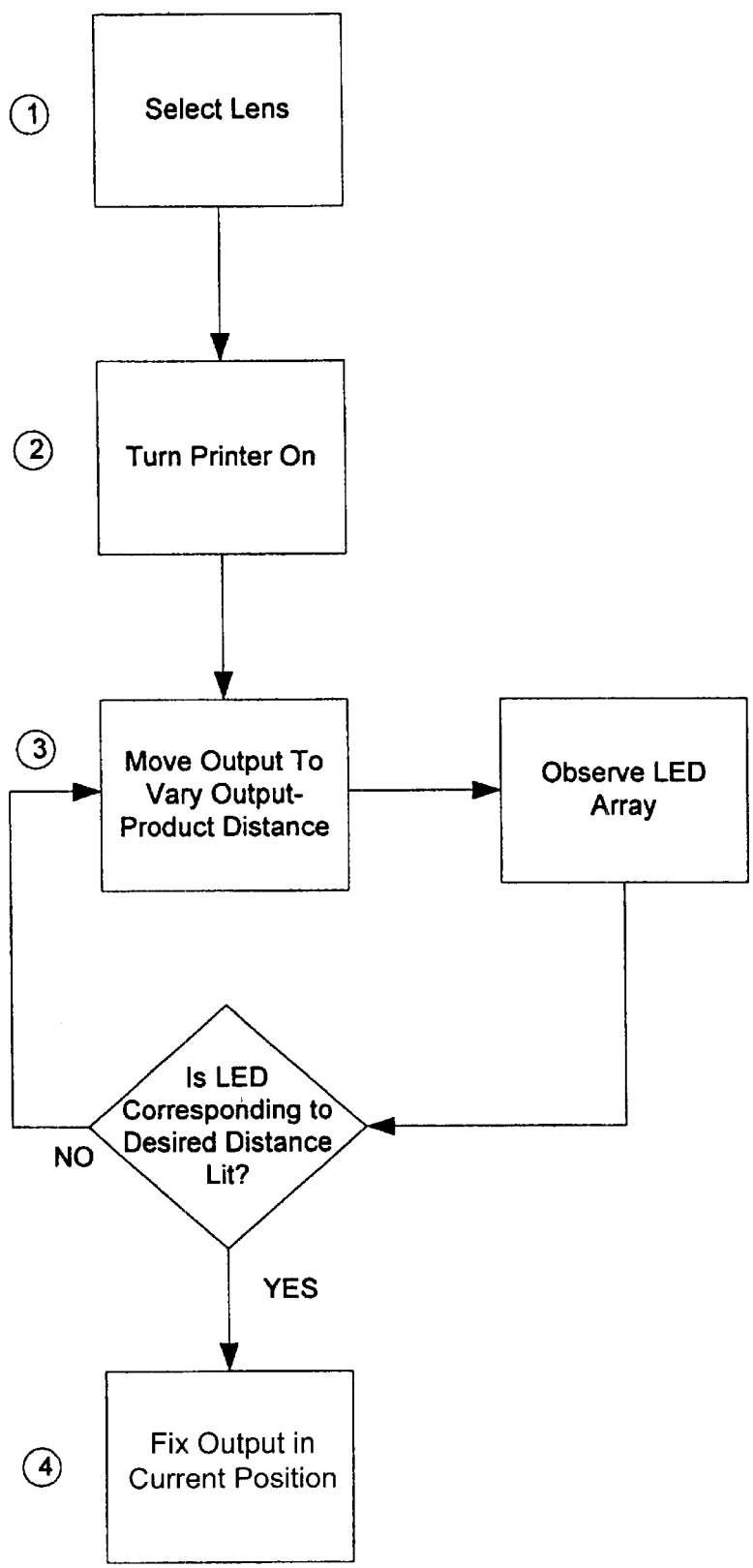
FIG. 2 is a flow chart of operations according to an embodiment of the invention.

The operation of this embodiment is shown in the flow chart of FIG. 2; with reference to the elements of FIG. 1. Initially, in Step 1 a human operator selects an output lens 5 having a known focal length, based on desired laser marking font size or other appropriate criteria. This lens will be inserted into the lens mount 3 at any point in time prior to the commencement of laser marking. The human operator turns the printer on in Step 2, supplying power and turning on the sensor unit 6. Having a sample of the product to be marked stationarily or periodically disposed along the product path 4 at a location in front of the sensor unit 6, the operator in Step 3 varies the distance 11 between the output lens 5 (and sensor element 9) and the products on the path 4. While the operator varies the distance 11, he or she also visually monitors the LED array 10. Thus, in Step 4 when an LED corresponding to the known focal length becomes activated, indicating that the distance 11 is equal to that focal length, the operator ceases moving the laser head 1, and fixes it in position. Depending upon whether the product is stationarily or periodically placed during this process, the appropriate LED will light in either a constant or periodic manner. After performing the process depicted in FIG. 2, the laser output lens 5 will be properly located at a distance equal to its focal length from products 2 which pass along the product path 4.

Figure 3:
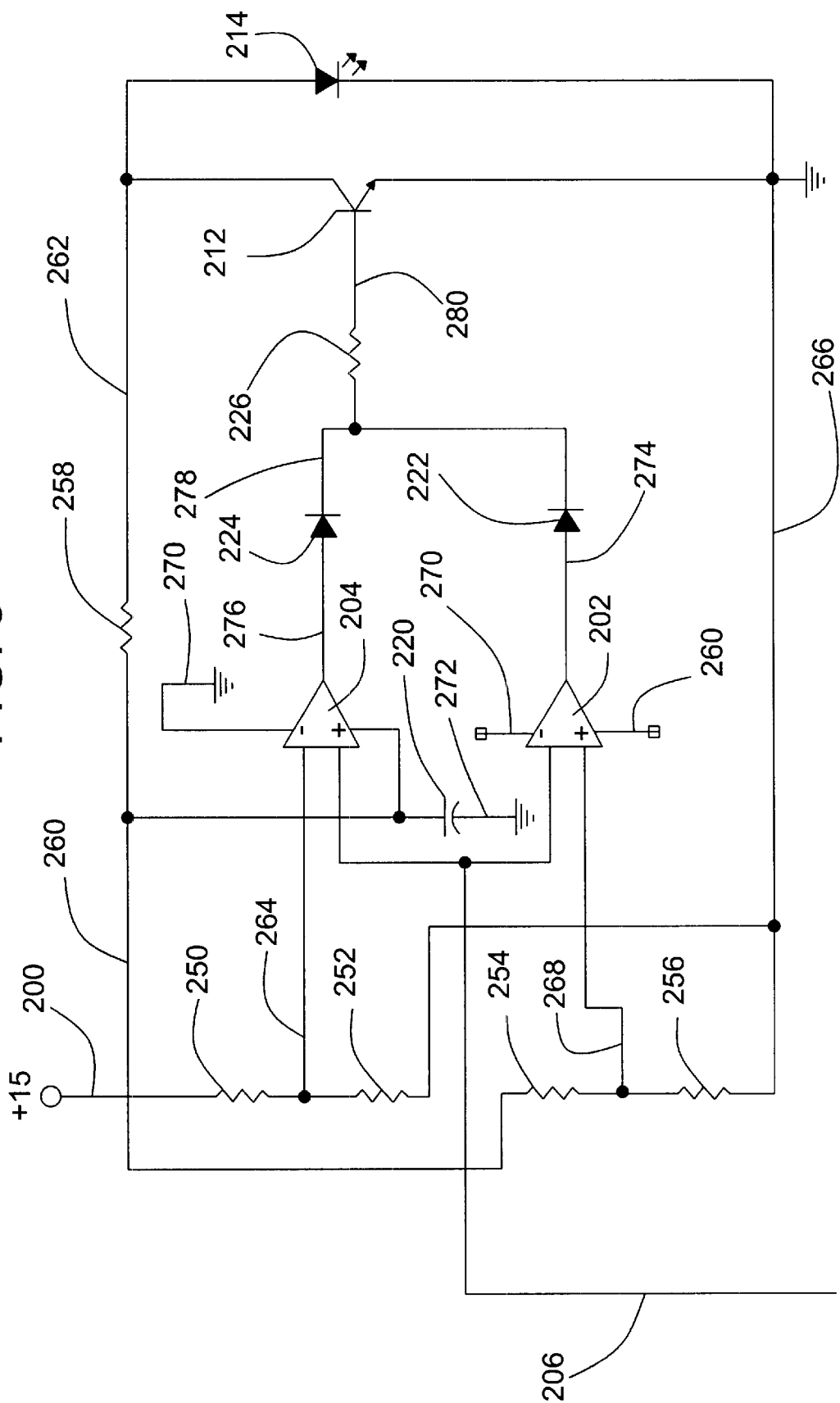
FIG. 3 is a schematic diagram of a circuit usable in an embodiment of the invention to activate a distance-indicating LED.

The schematic of FIG. 3 depicts a calibrated window comparator circuit usable in an embodiment of the invention to activate a given LED in the array 10 when the distance 11 corresponds to the distance indicated by that LED. In this embodiment, one circuit according to FIG. 3 is used for each LED to be lit. The circuit depicted in FIG. 3 is calibrated to indicate a distance of 2.5". One skilled in the art will appreciate how different resistor values may be used in the circuit to calibrate the circuit to respond to the same or different sensed voltages and thus the same or different desired distances. The circuit may be independently powered, or may be powered by the laser marking apparatus via an auxiliary port. The example in FIG. 3 receives power at an input 200 from the laser marking apparatus.

Although the particular selection and arrangement of elements is not critical, the sensor processor of FIG. 3 is constructed as follows: Resistors 250, 252, 254, 256, 258, and 226 have values respectively of 6.34 k, 316, 8.25 k, 316, 1.8 k, and 1.8 k ohms. Capacitor 220 has a value of 0.1 microfarads. These values are not critical. For example, a variance of the values of resistors 250 and 252 without changing their ratios will not affect the operation of the circuit. Similarly, a variance of the values of resistors 254 and 256 without changing their ratios will not substantially affect the operation of the circuit, although it may affect the power consumption of the system. The values of resistors 258 and 226 may also be varied without substantially affecting the operation of the circuit. Capacitor 220 may be replaced by a slightly smaller or larger capacitor without substantially affecting the operation of the circuit.

A positive voltage, in this case 15V, is applied at input 200 via line 260 to the supply voltage inputs on comparators 202 and 204, and to a first terminal of resistor 254, and to a first terminal of resistor 250, and to a first terminal of resistor 258, and to a first terminal of capacitor 220. The comparators may be built from standard op-amps such as those contained in the LM324A low power quad operational amplifier IC produced by SGS-Thomson Microelectronics, or may be built from separate transistors, other op-amps, or specialized comparator circuits. A second terminal of resistor 254 is connected via line 268 to a first terminal of resistor 256 and to the positive input of comparator 202. A second terminal of resistor 250 is connected via line 264 to a first terminal of resistor 252 and to the negative input of comparator 204. A second terminal of resistor 258 is connected via line 262 to the collector of transistor 212 and to the anode of LED 214. LED 214 may be any LED, such as the Radio Shack catalog number 276-0004 LED, or any other device which lights when a voltage is applied across it. Transistor 212 may be any transistor, such as the Motorola MMBT2222L, which acts in substantially the same way, or any other device which provides the same function within the circuit. Ground is connected via line 266 to a second terminal of resistor 256, to a second terminal of resistor 252, to the emitter of transistor 212, and to the cathode of LED 214, and via line 270 to the ground supply inputs of comparators 202 and 204, and via line 272 to a second terminal of capacitor 220. An analog input signal from the sensor 9 of FIG. 1 is applied via line 206 to the positive input of comparator 204 and to the negative input of comparator 202. The output of comparator 204 is connected via line 276 to the anode of diode 224. The output of comparator 202 is connected via line 274 to the anode of diode 222. The cathode of diode 224 is connected via line 278 to a first terminal of resistor 226. The cathode of diode 222 is connected via line 278 to the first terminal of resistor 226. A second terminal of resistor 226 is connected via line 280 to the base of transistor 212. Diodes 222 and 224 may be the BAV70 high capacitance diode sold by Fairchild Semiconductor, or any other element which operates in substantially the same manner, by allowing current to flow substantially in one direction only.

The comparators 202 and 204 have threshold values set by the resistors 250, 252, 254, and 256. Using resistors of 6.34 k, 316, 8.25 k, and 316 ohms respectively for 250, 252, 254, and 256 results in thresholds of about 0.55V and 0.7V for comparators 202 and 204. This is dependent on the supply voltage, which is 15V in this embodiment. For the Hyde Park SM606A-BOB-00, the analog output for a sensed distance of 2.5" falls between 0.55V and 0.7V. Accordingly, when the input 206 receives this voltage, the outputs of comparators 202 and 204 on lines 274 and 276 respectively, are low. This results in transistor 212 acting essentially as an open circuit, allowing LED 214 to be energized.

When the analog output of the sensor element 9 falls outside of this voltage window, the output of comparator 202 or comparator 204 will be high. This will cause transistor 212 to act essentially as a short circuit, pulling the potential on line 262 down to approximately zero volts. Accordingly, LED 214 will not be lit. It can be seen that several such circuits tuned to different voltage windows, and connected in parallel to the analog output of the sensor element 9, will allow several LED's to be selectively activated depending upon the distance 11 measured by the sensor element 9. Thus, a given distance 11 in FIG. 1 will result in a given analog output of the sensor element 9, causing the LED whose comparator circuit window includes that particular voltage to be lit.

In an alternative embodiment, the top comparator 204 may be switchably or permanently disabled (output low) or eliminated entirely. This would result in each LED remaining lit as long as the sensor output was higher than its threshold setting. Thus, instead of one LED being lit at a given distance 11, all of the LED's up to the most recently triggered LED would be lit.

Figure 4:
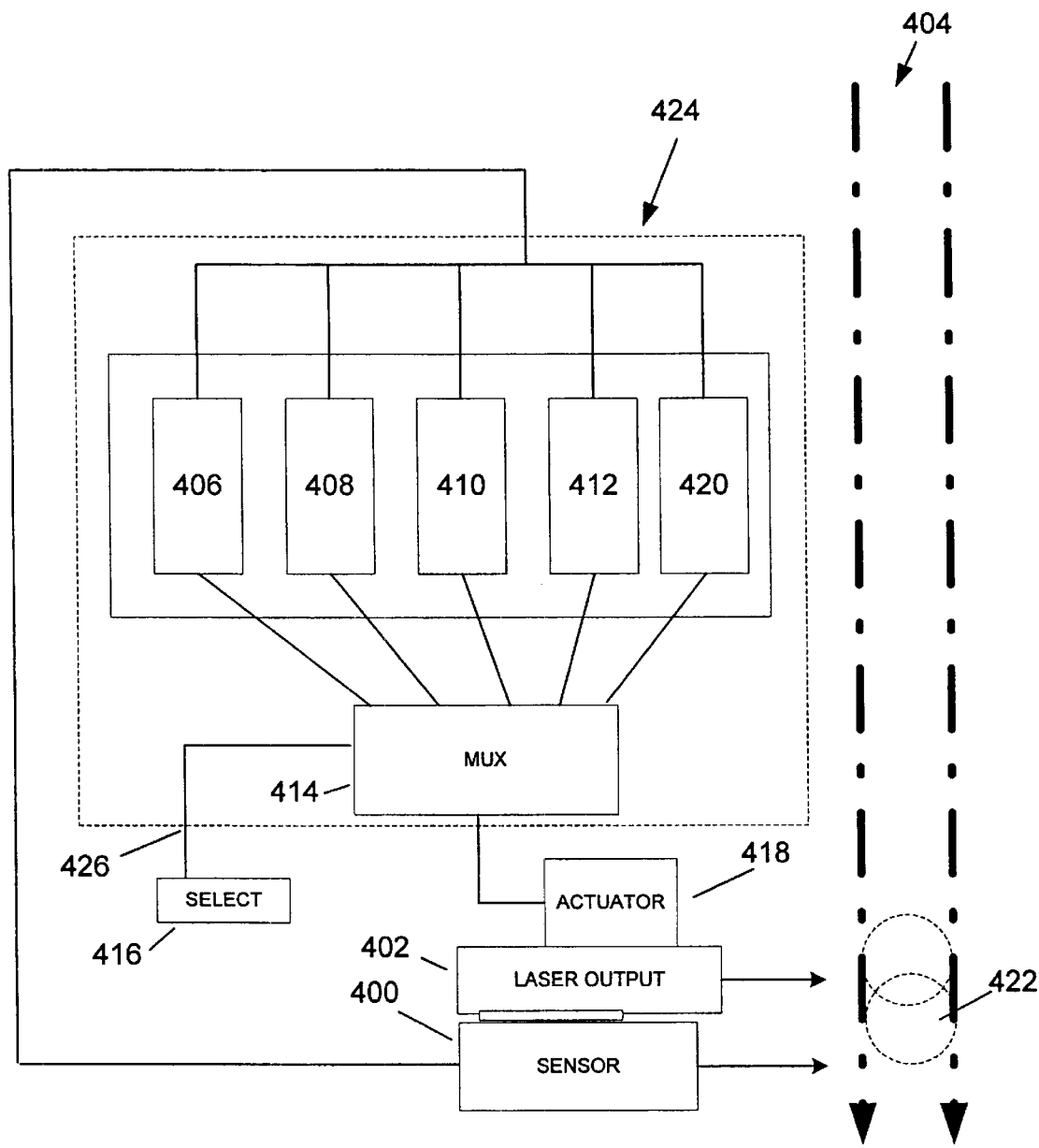
FIG. 4 is a block diagram illustrating a mode of operation of an alternative embodiment of the invention.

In an alternative embodiment, the sensor processor circuits are instead connected to provide a control signal to an actuator 418 which is drivably connected to the movable laser output 402 as shown in FIG. 4 to facilitate adjusting the distance between the laser output 402 and a product to be marked 422. In particular, similarly to the previous embodiment, the distance sensor 400 is preferably stationarily mounted with respect to the movable laser output 402, such that the distance sensed by the sensor corresponds to the distance between the laser output 402 and the product 422 positioned along the product path 404 in front of the laser output 402. The sensor processors 406, 408, 410, 412, 420 receive a signal output from the sensor 400 and preferably each supplies a sensor processor control output responsive to a different turn-on signal value corresponding to a particular distance between the laser output 402 and the product 422.

A signal sensor circuit 424 contains the sensor processors 406, 408, 410, 412, 420, and a mechanism such as multiplexer 414 communicatively connected via a control input 426 to selection mechanism 416. The sensor processor control outputs of the sensor processors 406, 408, 410, 412, 420 may be multiplexed by the multiplexer 414 responsive to the selection mechanism 416, or otherwise, such that the actuator 418 receives from the signal sensor circuit 424 a distance control output corresponding to a selected sensor processor circuit. In response to the received distance control output, the actuator 418 causes the movable laser output 402 to move relative to the product path 404, and to stop when the control output indicates that the signal output of the sensor 400 has reached the turn-on signal value of the selected sensor processor circuit. In such an embodiment, the sensor processor circuits 406, 408, 410, 412, 420 may still, but need not, provide a human-perceivable indication of the sensed distance. The selection mechanism 416 may be manually operable by an operator. Alternatively, the selection mechanism 416 may be automatically operated responsive to the detection and identification of a particular output lens being utilized, via coded contacts or other measures well known to those of skill in the art.

Those skilled in the art will readily appreciate that the above-described circuits may be modified by substituting other circuit elements for those specifically identified, or by constructing different circuits to serve the same purpose, and to obtain a substantial equivalents. In view of the many possible embodiments to which the principles of this invention may be applied in view of the disclosed embodiments, it should be recognized that the embodiments described herein with respect to the drawing figures are meant to be illustrative only and should not be taken as limiting the scope of invention. For example, those of skill in the art will recognize that human-perceivable indicators other than LED's or the particular configuration of LED's disclosed may be used to implement the invention. An audio signal may be provided in lieu of or in addition to the visual indicator. Such an audio signal could be for example a synthesized or pre-recorded voice, or a tone. Furthermore, the circuitry shown is not critical to the invention. For example, a delay circuit may be included so that in operation the LED corresponding to the current sensed distance stays lit, without flashing on and off, until a product distance that differs by a substantial amount is detected for a certain period of time. The illustrated embodiment can be further modified in arrangement and detail by those skilled in the art in view of the present teachings without departing from the spirit of the invention. Therefore, the scope of the invention as described herein contemplates all such embodiments as may come within the scope of the following claims and equivalents thereof to the fullest extent permitted by law.

We claim:

1. A apparatus for determining and indicating the distance from a laser marking apparatus movable laser output to an item to be laser marked, comprising:

a sensor mounted in a fixed relation to the output, wherein the sensor is adapted to sense the distance from the output to the item, and to supply a signal indicative of the sensed distance; and an indicating element adapted to receive the signal indicative of the distance, and to supply a human-perceivable indication corresponding to the sensed distance.

2. The apparatus according to claim 1, wherein the sensor is an ultrasonic sensor.

3. The apparatus according to claim 2, wherein the human-perceivable indication is a visual indication.

4. The apparatus according to claim 3, wherein the visual indication comprises an array of light emitting diodes, each diode corresponding to a distance, and wherein the indicating element is adapted to energize a diode in the array which corresponds to a distance which is substantially the same as the sensed distance.

5. The apparatus according to claim 4, wherein the indicating element is further adapted to energize each diode in the array which corresponds to a predetermined distance which is less than the sensed distance.

6. The apparatus according to claim 2, wherein the human-perceivable indication is an audible indication.

7. The apparatus according to claim 6, wherein the audible indication is a tone.

8. The apparatus according to claim 6, wherein the audible indication corresponds to a human voice.

9. A method of adjusting the distance between a movable laser output of a laser marking apparatus and an item to be laser marked, the apparatus having a sensor mounted in a fixed relation to the output, wherein the sensor is adapted to sense the distance and to provide a human-perceivable indication of the distance, the method comprising the steps of:

mounting at the output a focussing lens having a focal length;

varying the distance between the sensor and the item to be laser marked by moving the output;

observing the human-perceivable indication of the distance while varying the distance between the sensor and the item to be laser marked; and fixing the distance by fixing the output when the human-perceivable indication of the distance corresponds to a desired distance.

10. The method according to claim 9, further including the steps of:
   passing items to be laser marked sequentially by the output;
   operating the laser marking apparatus to laser mark the items which are passed sequentially by the output; and
   observing the human-perceivable indication to verify that it continues to correspond to the desired distance.

11. The method according to claim 9, wherein the step of observing the human-perceivable indication of the distance comprises the step of observing a light emitting diode, the lighting of which indicates that the distance corresponds to the desired distance.

12. The method according to claim 9, wherein the step of observing the human-perceivable indication of distance comprises the step of monitoring an audible signal source for a tone which indicates that the distance corresponds to the desired distance.

13. The method according to claim 9, wherein the step of observing the human-perceivable indication of distance comprises the step of monitoring an audible signal source for a voice signal which indicates that the distance corresponds to the desired distance.

14. A laser marking apparatus comprising:
   a movable laser output;
   an item position occupiable by an item to be marked;
   a distance sensor stationarily mounted with respect to the laser output, and sensingly mounted with respect to the item to be marked when occupying the item position; and
   a human-perceivable distance output communicably linked to an output of the distance sensor.

15. The apparatus according to claim 14, wherein the sensor is an ultrasonic sensor.

16. The apparatus according to claim 15, wherein the human-perceivable distance output is a visual indication.

17. The apparatus according to claim 16, wherein the visual indication comprises an array of light emitting diodes, the activation of each diode corresponding to a different distance.

18. The apparatus according to claim 15, wherein the human-perceivable distance output is an audible sound.

19. The apparatus according to claim 18, wherein the audible sound is a tone.

20. The apparatus according to claim 18, wherein the audible sound corresponds to a human voice.

21. An apparatus for setting a distance between a movable laser output of a laser marking apparatus and an item to be laser marked, comprising:
   a sensor mounted in a fixed relation to the movable laser output, wherein the sensor is positioned to sense a distance corresponding to the distance between the movable laser output and the item;
   a signal sensor circuit including (1) a set of sensor processors, communicatively coupled to a signal output from the sensor, each responsive to a turn-on signal value for the signal output, each having a sensor processor control output, (2) a control input to effect selection of one of the set of sensor processors, and (3) a distance control output, selectively coupled to one of the sensor processor control outputs, indicating when the signal output reaches the turn-on signal value of the selected sensor processor;
   a selection mechanism having a selection control output communicatively coupled to the control input of the signal sensor circuit; and
   a laser actuator communicatively coupled to the distance control output and physically attached to the movable laser output, the laser actuator including circuitry responsive to the distance control output, thereby effecting automatic positioning of the movable laser output at a distance from the item according to the selection mechanism.

22. The apparatus according to claim 21, wherein the signal sensor circuit further comprises a multiplexer receivably connected to the sensor processor control outputs and the control input, to selectively provide the distance control output corresponding to a sensor processor control output pursuant to a control input value received at the control input.

* * * * *